(12) United States Patent
Osebe et al.

(10) Patent No.: US 11,514,924 B2
(45) Date of Patent: Nov. 29, 2022

(54) DYNAMIC CREATION AND INSERTION OF CONTENT

(71) Applicant: International Business Machines Corporation, Armonk, NY (US)

(72) Inventors: Samuel Osebe, Nairobi (KE); Charles Muchiri Wachira, Karatina (KE); Komminist Weldemariam, Ottawa (CA); Celia Cintas, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 16/797,190

(22) Filed: Feb. 21, 2020

(65) Prior Publication Data
US 2021/0264929 A1    Aug. 26, 2021

(51) Int. Cl.
*G10L 21/0364*    (2013.01)
*G10L 25/90*    (2013.01)
(Continued)

(52) U.S. Cl.
CPC .......... *G10L 21/0364* (2013.01); *G06V 20/40* (2022.01); *G06V 40/20* (2022.01);
(Continued)

(58) Field of Classification Search
CPC ............... H04H 60/33; G06K 9/00335; G06K 9/00711; G10L 21/003; G10L 21/007
See application file for complete search history.

(56) References Cited

U.S. PATENT DOCUMENTS 5,659,658 A * 8/1997 Vanska .................. G10L 21/00
704/261
6,151,571 A * 11/2000 Pertrushin ............... G10L 17/26
704/209

(Continued)

FOREIGN PATENT DOCUMENTS

CN    107920785 A    4/2018
WO    2014/131194 A1    9/2014

OTHER PUBLICATIONS

Eva, K.W., et al., "Factors influencing responsiveness to feedback: on the interplay between fear, confidence, and reasoning processes", Advances in Health Sciences Education, Received Nov. 22, 2010, Accepted Mar. 11, 2011, Published online Apr. 6, 2011, Mar. 2012, pp. 15-26, vol. 17, Issue 1.

(Continued)

*Primary Examiner* — Samuel G Neway
(74) *Attorney, Agent, or Firm* — Scully, Scott, Murphy & Presser, P.C.; Shimon Benjamin

(57) ABSTRACT

In an aspect, during a presentation of a presentation material, viewers of the presentation material can be monitored. Based on the monitoring, new content can be determined for insertion into the presentation material. The new content can be automatically inserted to the presentation material in real time. In another aspect, during the presentation, a presenter of the presentation material can be monitored. The presenter's speech can be intercepted and analyzed to detect a level of confidence. Based on the detected level of confidence, the presenter's speech can be adjusted and the adjusted speech can be played back automatically, for example, in lieu of the presenter's original speech that is intercepted.

20 Claims, 7 Drawing Sheets

(51) Int. Cl.
*G10L 25/63* (2013.01)
*G10L 15/24* (2013.01)
*G10L 15/22* (2006.01)
*G10L 13/00* (2006.01)
*G06V 20/40* (2022.01)
*G06V 40/20* (2022.01)
*G10L 21/007* (2013.01)
*G10L 21/003* (2013.01)
*H04H 60/33* (2008.01)

(52) U.S. Cl.
CPC .............. *G10L 13/00* (2013.01); *G10L 15/22* (2013.01); *G10L 15/24* (2013.01); *G10L 21/003* (2013.01); *G10L 21/007* (2013.01); *G10L 25/63* (2013.01); *G10L 25/90* (2013.01); *H04H 60/33* (2013.01)

(56) References Cited

U.S. PATENT DOCUMENTS

| | | | |
|---|---|---|---|
| 6,774,920 B1 * | 8/2004 | Cragun | G06Q 10/10 715/730 |
| 6,938,032 B1 | 8/2005 | Heath et al. | |
| 7,454,460 B2 * | 11/2008 | Ivashin | H04L 29/06027 348/14.09 |
| 8,041,724 B2 * | 10/2011 | Bhogal | G11B 27/034 707/758 |
| 8,230,344 B2 | 7/2012 | Abujbara et al. | |
| 10,013,890 B2 | 7/2018 | Allen et al. | |
| 10,282,409 B2 * | 5/2019 | Allen | G06F 40/30 |
| 10,405,025 B2 | 9/2019 | Aimone et al. | |
| 10,942,563 B2 * | 3/2021 | Moncomble | G09B 19/04 |
| 2005/0198690 A1 | 9/2005 | Esolen et al. | |
| 2007/0186167 A1 | 8/2007 | Anderson | |
| 2008/0201141 A1 * | 8/2008 | Abramov | G10L 13/033 704/234 |
| 2008/0244373 A1 | 10/2008 | Morris et al. | |
| 2009/0138332 A1 * | 5/2009 | Kanevsky | G11B 27/34 705/7.29 |
| 2010/0048300 A1 * | 2/2010 | Capio | H04N 9/8205 463/36 |
| 2011/0178854 A1 * | 7/2011 | Sofer | H04N 21/4314 705/14.4 |
| 2013/0290434 A1 * | 10/2013 | Bank | G06Q 10/10 709/206 |
| 2014/0165087 A1 * | 6/2014 | Smith | G06Q 10/10 725/24 |
| 2014/0187210 A1 * | 7/2014 | Chang | H04W 4/16 455/414.1 |
| 2014/0281852 A1 | 9/2014 | Wolfram et al. | |
| 2014/0363000 A1 * | 12/2014 | Bowden | H04N 21/44222 381/56 |
| 2015/0222577 A1 * | 8/2015 | Weir | G06F 3/0482 715/730 |
| 2015/0348569 A1 * | 12/2015 | Allam | G10L 25/63 704/257 |
| 2016/0011729 A1 * | 1/2016 | Flores | G06Q 30/0201 715/728 |
| 2016/0226610 A1 * | 8/2016 | Pinzon Gonzales, Jr. | H04N 21/4667 |
| 2017/0206913 A1 * | 7/2017 | Nahman | G10L 21/007 |
| 2017/0295404 A1 * | 10/2017 | Meredith | H04H 60/33 |
| 2018/0091574 A1 * | 3/2018 | von Cavallar | H04N 21/251 |
| 2018/0122371 A1 * | 5/2018 | Vangala | G06F 40/295 |
| 2019/0028689 A1 * | 1/2019 | Aaron | H04N 13/39 |
| 2019/0147232 A1 * | 5/2019 | Ciano | G06F 40/194 715/732 |
| 2019/0286890 A1 * | 9/2019 | Khanna | G06F 16/337 |
| 2021/0264929 A1 * | 8/2021 | Osebe | G10L 21/0364 |

OTHER PUBLICATIONS

Costa, J., et al., "Regulating Feelings During Interpersonal Conflicts by Changing Voice Self-perception", CHI 2018, Apr. 21-26, 2018, 13 pages.

* cited by examiner

DYNAMIC CREATION AND INSERTION OF CONTENT

BACKGROUND

The present application relates generally to computers and computer applications, and more particularly to dynamically determining, creating and inserting content in presentation material A presentation program or software can be used to create content for presentation or display, for example, for conveying information and for discussion, for example, in a meeting, educational session and/or others. Presentation content can contain graphics, animation, text and other displays. Usually, a presenter prepares the presentation document such as a slide deck (e.g., a collection of pages) using a computer software or program package and presents such document during a presentation session.

BRIEF SUMMARY

A method and system that inserts content dynamically, for example, in a running presentation can be provided. The method, in one aspect, includes monitoring a viewer of a presentation material during a presentation. The method can also include, based on the monitoring, determining new content for insertion into the presentation material. The method can further include automatically inserting the new content to the presentation material.

A system, in one aspect, can include a hardware processor and a memory device. The hardware processor can be configured to monitor a viewer of a presentation material during a presentation. The hardware processor can also be configured to, based on the monitoring, determine new content for insertion into the presentation material. The hardware processor can also be configured to automatically insert the new content to the presentation material.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
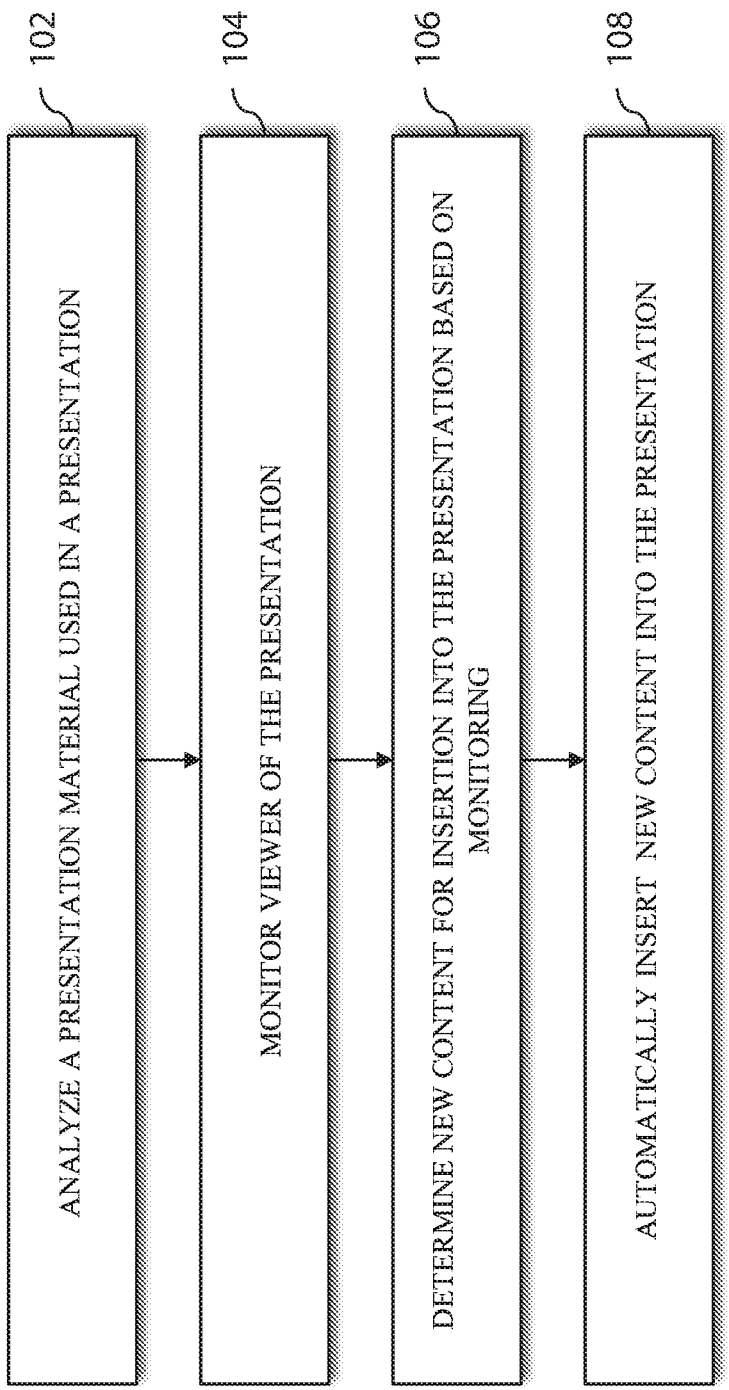
FIG. 1 is a diagram illustrating a method of automatically inserting content into a presentation in an embodiment.

A system, method and technique can be provided, which can dynamically insert content to presentation material, for example, in real time, for example, while the presentation is being made before an audience or the material is being discussed in a group. In an embodiment, a method may include monitoring viewers and/or a presenter of the material in real time and creating new content for insertion into the presentation based on the monitoring. The method may also include automatically inserting the created new content, for instance, without distracting a flow of the presentation. The method may also include augmenting physiological and vocal features and minimizing audience distraction during the presentation.

The following illustrates example uses cases for a method of dynamically determining content and inserting the content to a presentation material, for example, into a "running" presentation, a presentation being presented.

In an example scenario, e.g., scenario 1, a presenter may be speaking and presenting a series of presentation "slides" (e.g., pages), or material on a particular topic to an audience, some of who may be in the same room and others may be in remote locations, e.g., watching on a webcast. Questions and interests can evolve during the presentation. For example, audience members may interrupt with questions, a presenter may deviate from the presenter's course of topics, and so forth. Moreover, while during presentation, the presenter may be asked questions (e.g., to elaborate the concept/topic being discussion using examples), and during the course, the context, mood, and understanding of attendees of the presentation may change or evolve as the presentation proceeds or further discussion may emerge. Based on such settings a method in one embodiment can dynamically determine new or additional content and insert the content into the presentation.

In an example scenario, e.g., scenario 2, one or more presenters (e.g., job candidates, conference attendees) may benefit from strengthening of their confidence levels, for example, to gain or keep composure and confidence in presenting.

In various cases, it may be useful to automatically adjust (e.g., automatically add content into the presentation material such as a slide or slide deck) a presentation based on estimating one or more criteria or factors. In embodiments, a method may automatically generate and insert content on a "running" presentation based on monitoring one or more presenters and/or viewers of the presentation and/or taking into consideration various other factors.

In another aspect, during a presentation such as during a teleconference, it may be useful to intercept data such as the vocal features (pitch, tremor) and/or obtain physiological features (e.g., heart rate, sweat level) of the presenter to analyze the data and determine the presenter's confidence level, and play back the voice of a presenter in real-time. For example, upon detection of a loss of confidence or a decrease in the confidence level based on analyzing the intercepted data, a method may include manipulating the vocal playback to reflect the individual's voice in more confidential tone or mode, and/or adjusting feedback from the audience such as filtering out any distracting noise and/or removing focus from an audience with non-desired body language.

The method, for example, may analyze a given presentation (e.g., a slide deck or another digital document), which is being used for a meeting or discussion, monitor one or more viewers of presentation in real time, determine new content for insertion into the presentation based on monitoring, and automatically insert the determined new content into the presentation. The presentation may contain any of: text, images, audio, animations, virtual worlds and virtual world content, and/or others.

By way of examples, the monitoring of viewers may be performed via any of the following methods, for example, using one or more machine learning algorithms: analysis of words spoken (e.g., live comment and feedback given, questions asked); analysis of ambient sound (both noise and side-talk among audience members); analysis of ambient illumination levels; analysis of gestures; analysis of collective movement (e.g., fidgeting indicating restlessness; analysis of audience movement (e.g., audience members departing may indicate disinterest), analysis of viewer cohort, cognitive state of presenter, social network connections, analysis of participants' live comments on a smart e-presentation system, social media (e.g., for example, live chats and messaging); membership in an organization; position in an organizational hierarchy; whether audience members are cleared for viewing confidential material, and/or others. It may also be useful to monitor the audience for indications of its demographic or cultural characteristics.

For instance, the machine learning algorithms that monitor the one or more audience members may include, but not limited to: monitoring for changes in the ambient environment (e.g., noise, talking, light); monitoring for sentiment (e.g., expression, vocal tone, inflection or volume); monitoring for indications of cognitive states (e.g., restlessness, boredom, disinterest, loss of confidence); monitoring for signs of social activity (e.g., side-talk, questions from the floor); monitoring for indications of demographic or cultural makeup of audience (e.g., clothing, languages, accents); monitoring for indications of membership, clearance for reception of confidential information, or position in an organization. A trained machine learning model, for example, given input data can determine or predict data to be monitored.

The content to be automatically inserted may be determined from any one or more of, but not limited to: other presentations, an on-the-fly contribution from a viewer of the presentation. The content may also optionally be generated from the existing content of the slide. For example, a trained deep convolutional neural network (CNN) based image recognition system may be used to generate textual captions for an image for an audience that is not familiar with the images shown (e.g., laypeople viewing medical images, or students who are novices in a subject area). In another aspect, alternative text associated with an image may be extracted for the purposes of constructing captions. Similarly, this text, or other text, may be translated into another language.

A method may determine where to position the new content, e.g., at a current location or at a "future location" in a slide deck. For example, if a person in the audience poses a question on a topic to be discussed in next slides or pages in the "future" from the current slide or page, a relevant slide or content may be inserted into this region of the presentation material (e.g., 7 slides in the "future"). In another aspect, if the to-be-added content is an annotation to an existing slide, the method may determine where on the slide it should be positioned and at what point in time it should appear.

In an aspect, the method may include considering or taking into account the presenter's ability to respond to, understand, and/or describe the questions being raised before triggering the content insertion. The presenter may trigger the content insertion by gesturing, using a device such as a laser presentation pointer. The content insertion can also be triggered automatically based on an estimated need of the presenter (e.g., the presenter is stumbling, hesitating, exhibiting signs of confusion, etc.). For instance, the method may include responding automatically by displaying one or more captions or other assistive material associated with the slide. In an aspect, the presenter ability in relation to the new content can be inferred from the presenter's knowledge, skill, preference, style model or data available in a presenter information model or data.

In an aspect, based on receiving or detecting words of the speaker and in the audience, the method may include automatically searching one or more databases (e.g., of other presentations) and initiating to auto-insert (automatically insert) of one or more slides (content) of possible use as a presenter presents. The presenter may decide to use or not to use the auto-inserted content. In this way, for example, the automatically inserted material can be made available faster, if needed, and the presentation can be made smoother, as the inserted slide can be made available instantly similarly to a fast-access cache of content. The newly inserted slide (content) may be dropped automatically or manually if the probability of need for the slide decreases as the presenter presents. For example, the method may include adding a graphical indicator providing an option to skip the inserted content. Selecting the graphical indicator skips the inserted content from being presented. For instance, the presenter can skip the newly inserted slide (content) where a "skip me" sign (or another graphical indicator) may be shown to the presenter on the graphical user interface.

In an embodiment, the method of selecting and inserting new context may further take into consideration the presenter information (e.g., knowledge, skill, preference, style model) and context (e.g., visually rich versus text, example-based versus concept-based, etc). The method may further include identifying which portion of the content is relevant for which concepts, and further, may include identifying how the overall content flows in the slide for the topic/concept. The inserted content may be tailored to the needs of viewers for the allocated presentation duration (e.g., time availability may be taken into consideration).

The weights on the words may be controlled (e.g., the words of the presenter versus the words of a question in the audience) for determining which slides to insert. Also, the audience may make requests (e.g., into a smartphone) of possible slides to insert in real-time, which the method may receive for content insertion.

In an embodiment, the system and method for auto-injecting new content (e.g., slides) from a plurality of content sources may include selecting, chunking and linking concepts related to the monitored viewers and to the presenter's knowledge (e.g., implemented as a knowledge graph); estimating a set of pre-requisite concepts and past concepts from a topic knowledge graph; considering audiences' (including remote audiences) current state of knowledge, mood, engagement, and context; and estimating and giving a summary of further concepts this new content can help in understanding.

The content can be sequenced in a logical manner such that the newly inserted content flows logically with the existing presentation. A method of content sequencing may be based on a sequencing of the content using chronology information in the presentation organization, presenter knowledge represented by a knowledge graph, and metadata extracted from monitored viewers. In an aspect, the method may include extracting metadata, such as concept difficulty, content reordering, and content redundancy, to provide further input on how the new content may be used in the presentation. The metadata may be extracted from data associated with monitored viewers and may include data resulting from analysis of the real time comments and feedback given, questions asked, analysis of gestures, and analysis of viewer cohort.

The method may include estimating overall sentiment or mood of the audience and using this estimation to determine content and style of slides to be presented as a presentation evolves, while a presenter is giving the presentation. For example, analysis may be performed with known technique or techniques to estimate the mood. Other sentiment analysis may be performed based on words spoken and prosody. In an aspect, the method may include differentiating between words spoken by remote viewers of a presentation and words spoken by participants in the same room as the presenter.

The system may weight words (and comments) spoken based on the role of a person speaking them, e.g., a manager in a corporation, vice president, customer or client who is in the audience, etc. For example, different weights can be given to comments from different individuals having different roles. By way of example, a comment such as "I would like to see a performance figure for product X," made by an individual above a threshold weight, such comment may trigger an automatic insertion of a performance figure or chart in the presentation. In another aspect, a request can be sent to a remote presentation assistant personnel who can automatically generate relevant figures and insert the content to the "running" presentation remotely.

In an aspect, the method may take account of fees that may be charged to obtain copyrighted material in real time and to present it, for example, automatically insert the material to the presentation. The method may optionally include paying copyright fees for on-the-fly usage.

In an aspect, the content insertion need not be confined to static words and images. For example, a presentation can include augmented reality and/or virtual reality (VR), and become more immersive for an audience, which optionally may be wearing head-mounted displays.

In an aspect, and optionally, a slide that contains costly content may be auto-inserted based on meeting a criterion, for example, listening to an advertisement (e.g., a 5-second advertisement), for instance, to offset the cost of obtaining content which may be needed to foster understanding or making a key point.

In an aspect, the method of triggering content insertion and/or modification may include generating or inserting of a slide (or content for existing slide) for a particular concept (e.g., C) being presented. In an aspect, to determine the content for insertion and/or modification, the method may also determine a set of prerequisite concepts (e.g., C') that are required to be discussed before discussing the concept C, and a set of concepts following the content where C is applied. Such prerequisite and following content may be dispersed throughout the presentation. The method may also use a weighed similarity measure function (e.g., cosine distance, K-means Euclidean, etc.) to obtain a score of how strongly a new content is aligned with concept C (e.g., relevant to C) based on content similarity, query expansion measures, and inputs from monitored viewers' data.

In an aspect, the method may learn from past attempts to auto-insert, what content is useful to insert, with consideration of the audience (including audience cohort such as high-school students, business leaders, etc.). Slides may also be dropped from a deck based on a criterion. If an auto-inserted slide generates discussion and enthusiastic response (e.g., the audience says "this is interesting"), the slide may be retained in the default slide deck more readily than a slide that is auto-inserted but is not actually presented to the audience (for example, because the speaker decides to skip over it, or if the presentation is becoming too long).

Using this learning approach, and monitoring of audiences in real-time, the method may include publishing different versions of the work in different media. The method may also include automatically generating sequences of presentation slides from a subset of the content items for distribution to users of the published versions. In an aspect, even if all the slides in a slide deck are not presented, a longer presentation may be created for subsequent study.

The method may also include taking into consideration the device or display device is being used, for example, the presenter's device and viewer device or devices. For example, if it is determined that 100% of the viewers are sitting in an auditorium watching the presenter, different slides or content may be auto inserted than if it is determined that 80% of the audience is viewing the presentation on a smartphone. Bandwidth may also be considered. For example, high bandwidth animations (which also may require central processing unit (CPU) resources) may or may not be inserted based on device assessment for the audience, or different slides may be inserted for subsets of viewers.

The content to be inserted may be different for audiences in different locations. For instance, some audience members can be collocated in a room, and/or others may be viewing the presentation in remote locations. The method may include modifying the version of the presentation that is being shown in one or more remote locations based on any one or more of the location and the characteristics of the audience in that location. Examples may include, but not limited to: adding textual captions for a presentation being viewed by a hearing-impaired user or a user in noisy environment such as an airport; adding textual transcriptions of questions from the local audience, since such questions can be inaudible to remote participants; adjusting the visual or auditory characteristics of the presentation to be more legible or audible in the remote environment in which it is being viewed and heard, in response to detection of the ambient characteristics of the remote environment, or in response to indications that the audience is having difficulty seeing or hearing; omitting or replacing portions of presentations that contain confidential material, when the presentation is being viewed from a non-secure location such as an airport, or over a non-secure connection; omitting or replacing portions of presentations that contain culturally offensive material, e.g., based on determining that the remote audience is likely to include members of such a cultural group based on its location and indications (dress, language, accent) gained from monitoring the remote audience.

In an aspect, in a virtual reality or augmented reality setting, for example, in which a viewer may wear goggles and see a customized 3D object superimposed on the presenter's screen during a presentation, the method may include automatically inserting an object using goggles or smartphone, while the user views a presentation in an auditorium.

Various presentations may be searched in various manners and at various granularities, e.g., at the granularity of a single slide, in order to build new presentations from presentations published, for example, on an intranet (or internet). Such content may be accessed and searched by search engines. Using optional metadata in a database, individual slides may be selected for incorporation into a new presentation file.

Different file types, client-server configurations, and data storage methods may be used. In an aspect, multiple databases may be involved. For example, a library table may hold information about the original presentations, including the location of the file and whether it is available for individual slides to be copied.

In an aspect, the auto-inserted slides or content may be inserted with a consideration of delivering customized and personalized content for special audiences (e.g., plain language definitions, alternative augmentative communication symbols, or speech), for audiences with a variety of cognitive challenges.

In an aspect, the inserted content need not be limited to slides in a slide deck. For example, the content may include a "voice over" narration that helps explain content. The role of the creator of other slides may be considered during the selection and auto-insertion process, e.g., a scrum master, a product owner or a scientist.

During an automatic content insertion, the method may include notifying the presenter that the insertion is taking place (e.g., during the presentation). For example, a signal such as a subtle sound may be emitted, or the current slide may have a visual indicator such as a "green dot" placed in the corner.

In an aspect, the method may include generating summarized key points and adding into the "Presenter Notes" section to help guide the presenter. Transitions between slides can be animated in a variety of ways, as can the emergence of elements on a slide itself. This may optionally reflect the nature of how the slide was added to a deck; e.g., auto-inserted slides may have a different kind of transition from extant slides in a deck.

The method of automatically inserting content may also take into consideration the cohorts of people viewing a presentation. For example, viewers having different roles or responsibilities may benefit in different ways from different auto-insertions. Different auto-insertions can be performed based on the roles and responsibilities of the viewers. Different auto-insertions may automatically be considered based on the proportion of the audience that have different roles and/or responsibilities. Different auto-insertions may automatically be considered based on where in a timeline (e.g., project or product timeline) a project is at.

In an aspect, one or more policies can be employed regarding what content can be combined and joined with other content, and what cannot be combined. Enforcement can be done with various forms of access control. Feedback on auto-inserted content can be monitored, received and/or assessed. Based on the feedback, the method may learn to determine what content to include and/or not include in the future.

In an aspect, with a virtual reality presentation, a three-dimensional (3D) computer world based on a user scenario may be employed, which works according to rules and can be controlled and manipulated in real time. The method may include interacting in real time in this three-dimensional computer world based on user actions. Such presentations may make use of one or more of: realistic computer graphics; non-linear and multilevel interaction storytelling; user-friendly visual interfaces; intuitive methods of 3D objects navigation and manipulation; and high-quality and realistic visual and sound effects.

FIG. 1 is a diagram illustrating a method of automatically inserting content into a presentation in an embodiment. A method in one aspect may include analyzing a presentation material used in a presentation, monitoring viewers of the presentation in real time, determining new content for insertion into the presentation based on monitoring, and automatically inserting the new content. Content can be inserted automatically in real time, e.g., during the presentation session.

The method can be performed by one or more processors, e.g., hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor or a hardware processor may be a central processing unit (CPU), a graphics processing unit (GPU), a field programmable gate array (FPGA), an application specific integrated circuit (ASIC), another suitable processing component or device, or one or more combinations thereof. A processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

At 102, the method can include analyzing a presentation material used in a presentation. For example, the content of the presentation can be determined using semantic analysis, text analysis, topic analysis, and/or another technique. For example, a current slide or page of the presentation can be analyzed to determine its topic and content. A processor may execute a software component, which may link to, or communicate with presentation software or program, and determine which page or slide the presenter is presenting currently, and determine the content displayed or presented in that current page or slide.

At 104, the method can include monitoring one or more viewers of the presentation in real time. For instance, voice or speech analysis and natural language processing techniques can be employed to detect questions and comments generated by the viewers; image analysis such as expression analysis can be performed to determine a state of a viewer or audience. Voice or speech data can be received via a microphone or another sound detection device, for example, installed in the vicinity of the audience, or for example, connected or coupled to the audience or viewer's device or devices. Similarly, image data can be received via a camera or another photo or video taking device, for example, installed in the vicinity of the audience, or for example, connected or coupled to the audience or viewer's device or devices.

Monitoring of viewers may be performed via any one or more of, but not limited to: analysis of words spoken (e.g., comment and feedback given, questions asked); language of viewers; analysis of ambient illumination or noise level and quality; analysis of gestures; analysis of collective movement (people entering or leaving); analysis of viewer cohort, cognitive state, social network connections; analysis of participants live comments on a smart e-presentation system, social media; determining one or more viewer positions in an organizational hierarchy.

Data associated with the monitoring, for example, one or more viewer questions and/or comments, viewer expression and/or gestures, and/or other monitored data can be correlated to the current slide or page being presented. For example, a data structure can be created that stores the correlation of the current slide or page of the presentation and the monitored data associated with monitored viewers.

In an aspect, the monitoring can also include monitoring the presenter, e.g., the presenter's voice via speech or voice analysis, the presenter's movements via image analysis. Other sensor or sensor devices can be used that detect the presenter's physiological state.

At 106, the method may include determining new content for insertion into the presentation based on monitoring. In an example, based on a text analysis of questions and/or comments generated by one or more viewers, the method may search for new content which can provide answers or clarifications relates to the viewers' questions and/or comments. If the result of the image analysis of the viewers shows an indication that the viewers may need further clarification (e.g., puzzled expression), the method may search for new content which may further explain the topic of the presentation (e.g., current slide). A search engine, for example, can be employed to search for new content. In an embodiment, the search engine may search known web sites, databases, and/or another data source.

At 108, the method may include automatically inserting the new content into the presentation in real time, for instance, while the presentation is being displayed or presented. The presentation can contain any one or more of, but not limited to, text, images, audio, animations, virtual worlds and virtual world content. The presentation can contain other content type.

The new content, which is automatically inserted, can be obtained from any one or more of, but not limited to, other presentations, an on-the-fly contribution from a viewer of the presentation, from a remote presentation assistant personnel, and content generated by an image-recognition program, natural language processing program, and/or others.

Figure 4:
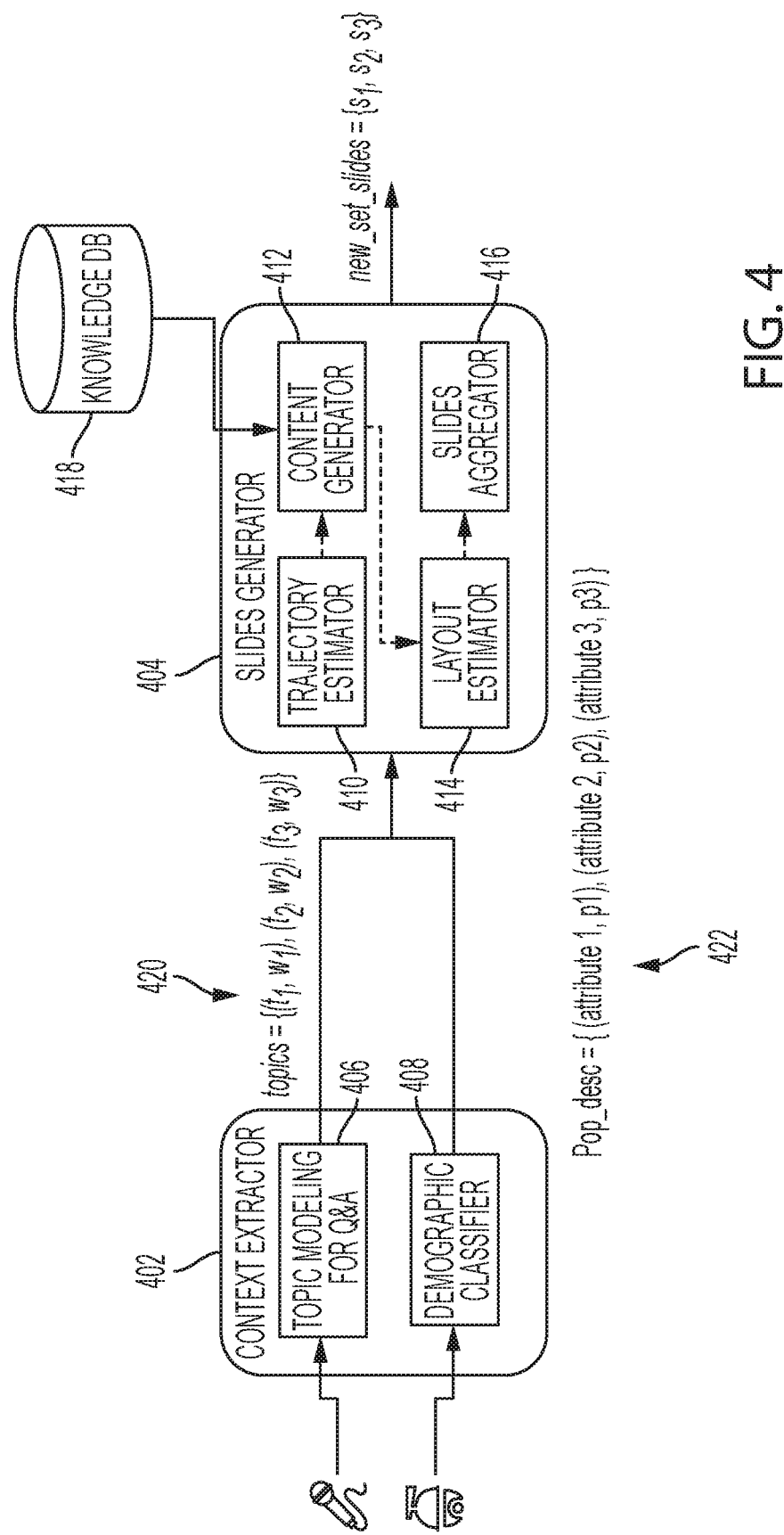
FIG. 4 is a diagram illustrating an example implementation for generating content in an embodiment.

The method may also determine where to position the new content, e.g., at a current location or at a "future location in a slide deck, or where on a slide captions or annotations should be positioned. FIG. 4 is a diagram illustrating an example implementation for generating content in an embodiment. The components shown include computer-implemented components, for instance, implemented and/or run on one or more processors such as hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

Referring to FIG. 4, a context extractor component or module can perform topic modeling and demographic classification. In one embodiment, input topics of the content to change with their correspondent weights 420 (e.g., $\{(t_1, w_1), (t_2, w_2), (t_3, w_3)\}$ and information regarding demographics of the viewers watching the presentation 422 (e.g., {(demographic related attribute 1, p1), (demographic related attribute 2, p2), (demographic related attribute such as profession, p3)}) with their proportions are extracted from the context extractor module 402. A topic modeling component or module 406 may extract topic and corresponding weights from a presentation. A demographic classifier 408 may classify or determine audience information. A slide generator component or module 404 may generate new content, e.g., based on such input. A trajectory estimator component or module 410 uses an Optimal Path algorithm to estimate the new number of sections and/or slides needed to cover a new topic or topics for the specific population, and outputs a sequence of slides $S_{traj}$. The viewer information 422 is passed into a layout estimator component or module 414. In one example, the layout estimator module 414 can be implemented with a trained conditional generative adversarial network to generate the specific layout conditioned to that population Lp. A content generator component or module 412 uses the one or more topics as keywords to extract content from knowledge database 418 with extractive summarization tools and $S_{traj}$ to determine or restrict the amount of material to be displayed. The module outputs $C_{topics}$ (this can contain memes, text, animations, figures, etc.). $L_p$ and $C_{topics}$ are passed to a slides aggregator component or module 416 for merging proposes.

The method may also detect "loss of confidence" of a presenter by analyzing the presenter's physiological and vocal features. The method may further include influencing self-confidence by altering play-back according to the detected "loss of confidence". For instance, the presenter's voice can be altered via a speech synthesizer to stabilize or strengthen the voice characteristics.

The method can include automatically injecting new content (e.g., slides) from a plurality of content sources. For example, content from other sources can be selected, chunked (cut), which have concepts related to monitored viewers and/or the presenter. In an aspect, a knowledge graph associated with a presenter's knowledge can be built and utilized to determine concepts associated with the presenter. Concepts related to the monitored viewers can be determined based on information obtained from monitoring the viewers. The method can also include estimating a set of prerequisite concepts and past concepts associated with the concepts, for example, from one or more topic knowledge graph associated with the concepts. The method can also include considering audiences' (including remote audiences) current state of knowledge, mood, engagement level, and context. The method can further include estimating and giving a summary of further concepts the new content will help in understanding.

The method may also include content sequencing by ordering the content, using chronology information in the presentation organization, presenter's knowledge (e.g., determined based on a knowledge graph associated with the presenter), and metadata extracted from data associated with monitored viewers. For example, the trajectory estimator may use one or more Optimal Path algorithms to estimate a new number of sections and/or slides, which may be required to cover a new topic for the specific audience viewers and may output a sequence of slides $S_{traj}$. The population information can be passed into the layout estimator. In one example, the layout estimator can be implemented with a trained CGAN (Conditional Generative Adversarial Network (GAN)) to generate a specific layout conditioned to that population $L_p$.

Using information extracted from monitoring viewers, e.g., analysis of comment and feedback given, questions asked, analysis of gestures and analysis of viewer cohort, the method may include extracting metadata, e.g., using content analytics program (e.g., Long Short Term Memory (LSTM) and neural network based model) from the newly generated content, such as concept difficulty, content reordering, content redundancy to provide further inputs on how the new content may be used in the presentation.

In an aspect, the auto-insertion of new content into a present material during a presentation can be triggered based on determining an estimated need of the presenter, for example, estimated based on monitoring the presenter's state such as the presenter's physiological state, for example, stumbling, hesitation, exhibition signs of confusion. Such estimation can be performed based on voice analysis and image analysis of the speech and images monitored of the presenter.

The method may also include selectively modifying or inserting new content in a presentation being presented to a remote location, for example, via a computer or another communication network, for example, based on monitoring the audience in that remote location. Monitoring of the remote location audience can similarly be done by receiving and analyzing the audience's questions, comments, and images if available. For example, the content generator can use the topics as keywords to extract content from knowledge database with extractive summarization tools and $S_{traj}$ to determine the amount of material to be displayed. The content generator module in an embodiment outputs $C_{topics}$. The output $C_{topics}$ can contain memes, text, animations, figures, and/or others. $L_p$ and $C_{topics}$ can be passed to the slides aggregators for merging.

The method may also include determining whether existing content is to be modified, obscured, and/or deleted from the presentation.

Figure 2:
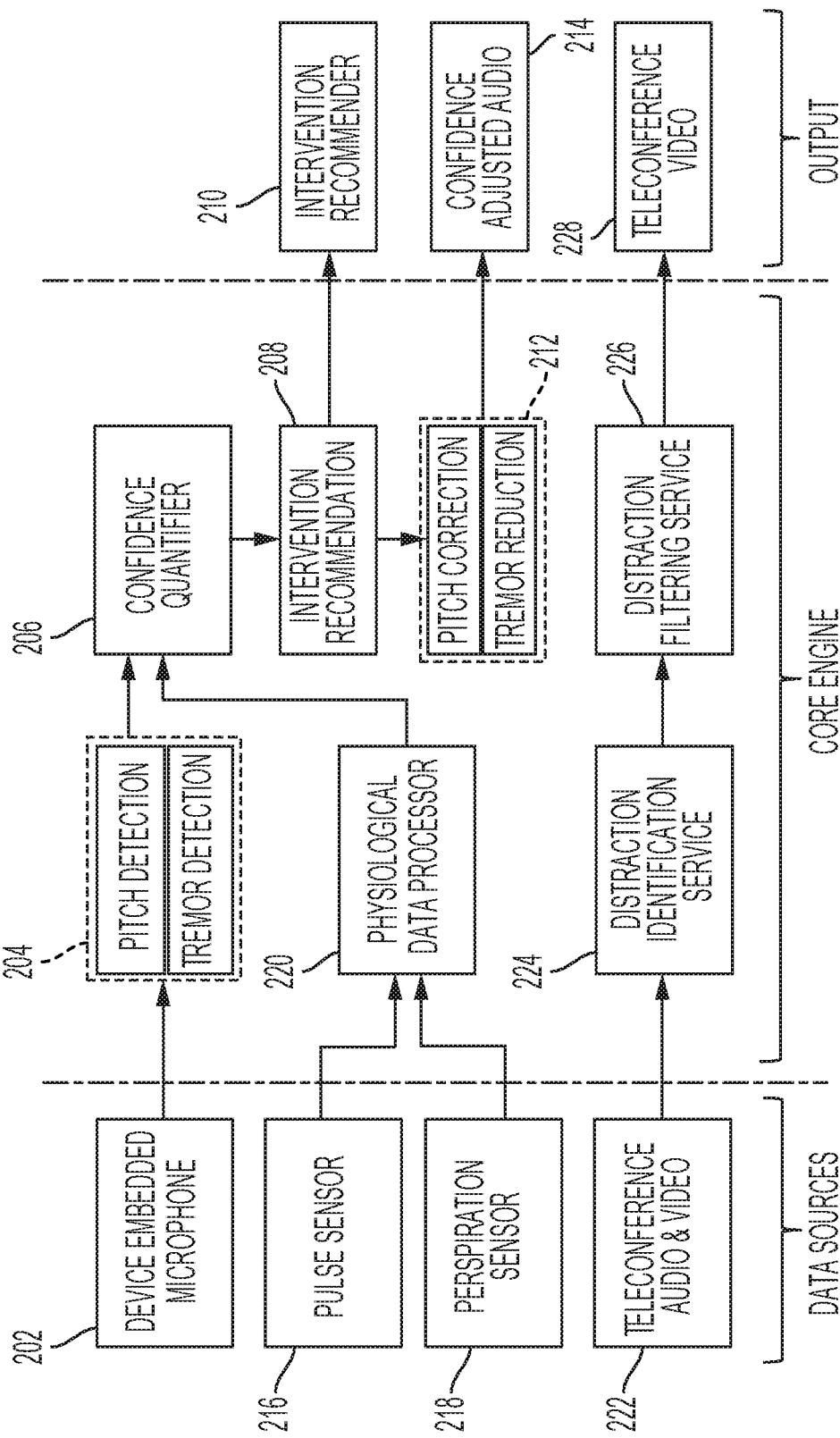
FIG. 2 is a diagram illustrating a method of determining a presenter's state by analyzing physiological and vocal features in an embodiment.

FIG. 2 is a diagram illustrating a method of determining a presenter's state by analyzing physiological and vocal features in an embodiment. The determined state can help in automatically detecting whether the presenter is experiencing a "loss of confidence" while presenting. The method can include adding content to the presentation dynamically, in real time, which would help bolster the presenter's confidence level. In another aspect, the presenter's voice can be played back, for example, using a voice synthesis technique, which removes an indication that the presenting is losing confidence such as a tremor in the voice, decreasing vocal volume, and/or another. For instance, the voice synthesized can reflect or simulate a stronger and steadier voice of the presenter. A device such as a microphone 102, embedded in a device such as a computer being used in the presentation, can be used to obtain the presenter's speech or voice data. A processing component referred to as an engine, which may be a hardware processor or a program running on the hardware processor, can receive the voice data from the microphone 202 and detect pitch and tremor in the voice, for example, shown at 204. At 206, the engine can determine a confidence level based on the pitch and tremor detected in the voice. For instance, a confidence level can be quantified based on a range of pitch and tremor values. At 208, intervention recommendation can be triggered, for example, if the confidence level is below a threshold value. For example, at 210, the engine can notify an intervention recommender. The intervention recommendation may determine what steps to take in order to restore confidence to an acceptable level. The intervention can be both digital and behavioral. Digital intervention involves pitch correction and tremor reduction for the audio stream. The intervention recommender may recommend behavioral actions to take. For example, given a high pulse it can recommend to the presenter to relax and take a glass of water. At 212, an intervention can include correcting the pitch and reducing the tremor in the voice. At 214, the corrected pitch and reduced tremor is output as confidence adjusted audio.

A device such as a pulse sensor 216, perspiration sensor 218, and/or another sensor can be used to determine a physiological state of the presenter. For example, the engine may receive data from the devices 216, 218, and process the data at 220 to determine the physiological state. For example, the values of the pulse and perspiration data can be correlated to different confidence levels. For instance, if the values of the data from the pulse sensor and the perspiration sensor meet a threshold value, it can be determined that the presenter may be losing confidence. The engine can then trigger an intervention recommendation at 208.

Teleconference audio and video device or devices 222 can also provide data to the engine. At 224, the engine, based on the received teleconference audio and video data can identify whether the presented is distracted, for example, by analyzing the voice and images of the presenter. For instance, the engine may analyze and determine movement, gesture from the image or video data. The engine may also perform speech analysis and natural language techniques to determine whether the presenter is being distracted. At 226, the engine may filter any distraction detected in the audience in the teleconference video and output the teleconference video without the distraction at 228. For instance, images or videos that show distracted movements can be deleted. For example, based on the video and audio provided by the teleconference system, the method may detect noise such as laughter and one or more members of the audience who are not concentrating on the presentation. Such detection can be done by outlier detection which can detect behavior that is not consistent with the rest of the audience. The detected distraction can then be removed from the teleconference stream such that the detected distraction is not shown or presented to the presenter or other remote audience.

Figure 3:
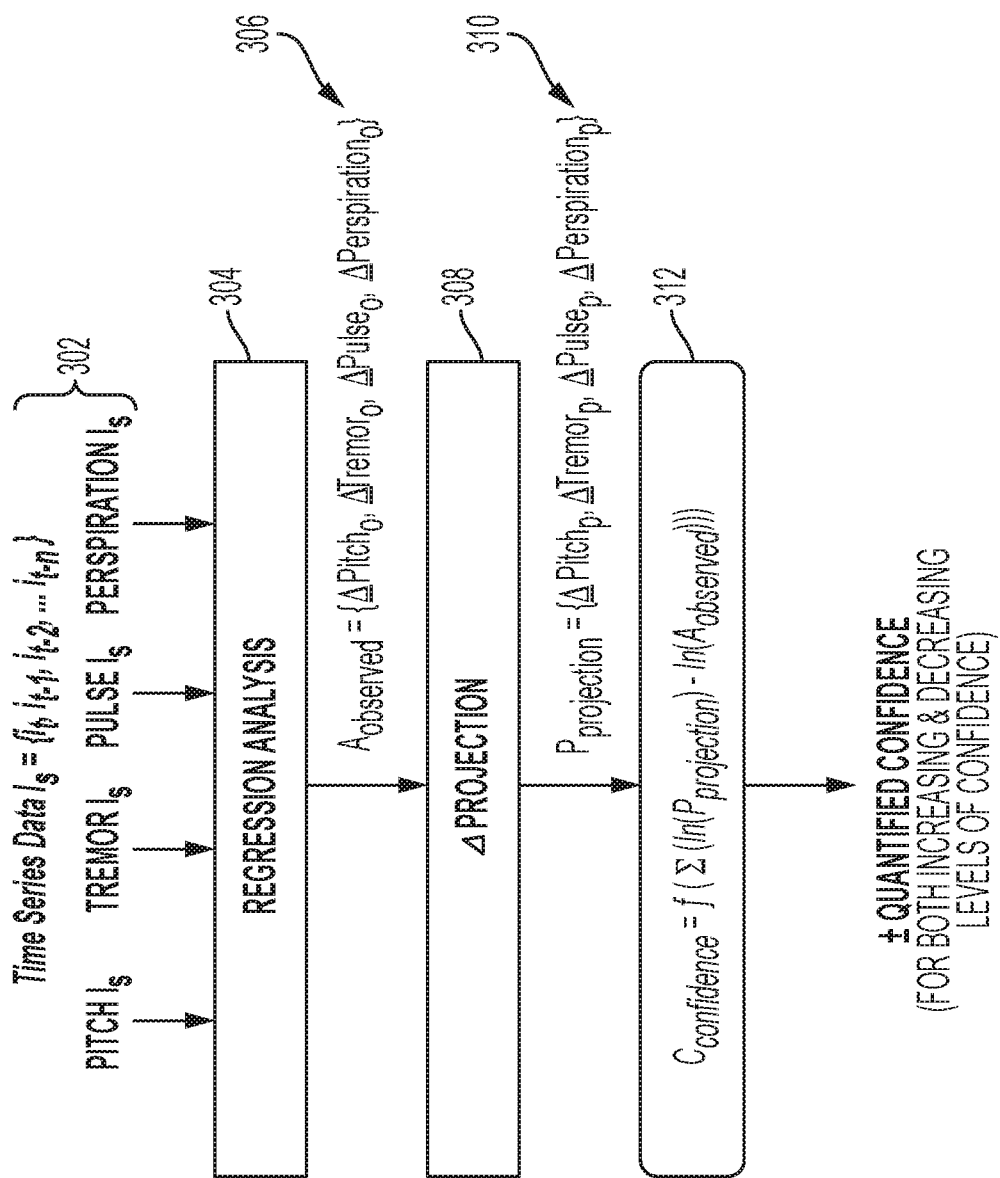
FIG. 3 is a diagram illustrating quantifying of a confidence level in one embodiment.

FIG. 3 is a diagram illustrating quantifying of a confidence level in one embodiment. An example input 302 is time series data, which may include data such as pitch, tremor, pulse and a physical or physiological state or level such as a perspiration level for a specific time instance. Measurement of Regression analysis 304 is performed on the data to quantify the changes of the data types over time. At 308, the trend observed 306 can be used to project values for the data types in the future which can be useful to identify onset of loss of confidence. At 312, confidence can be determined by comparing the natural logarithm of projected and observed values, where a negative value indicates decreasing and positive value indicates increasing values.

Figure 5:
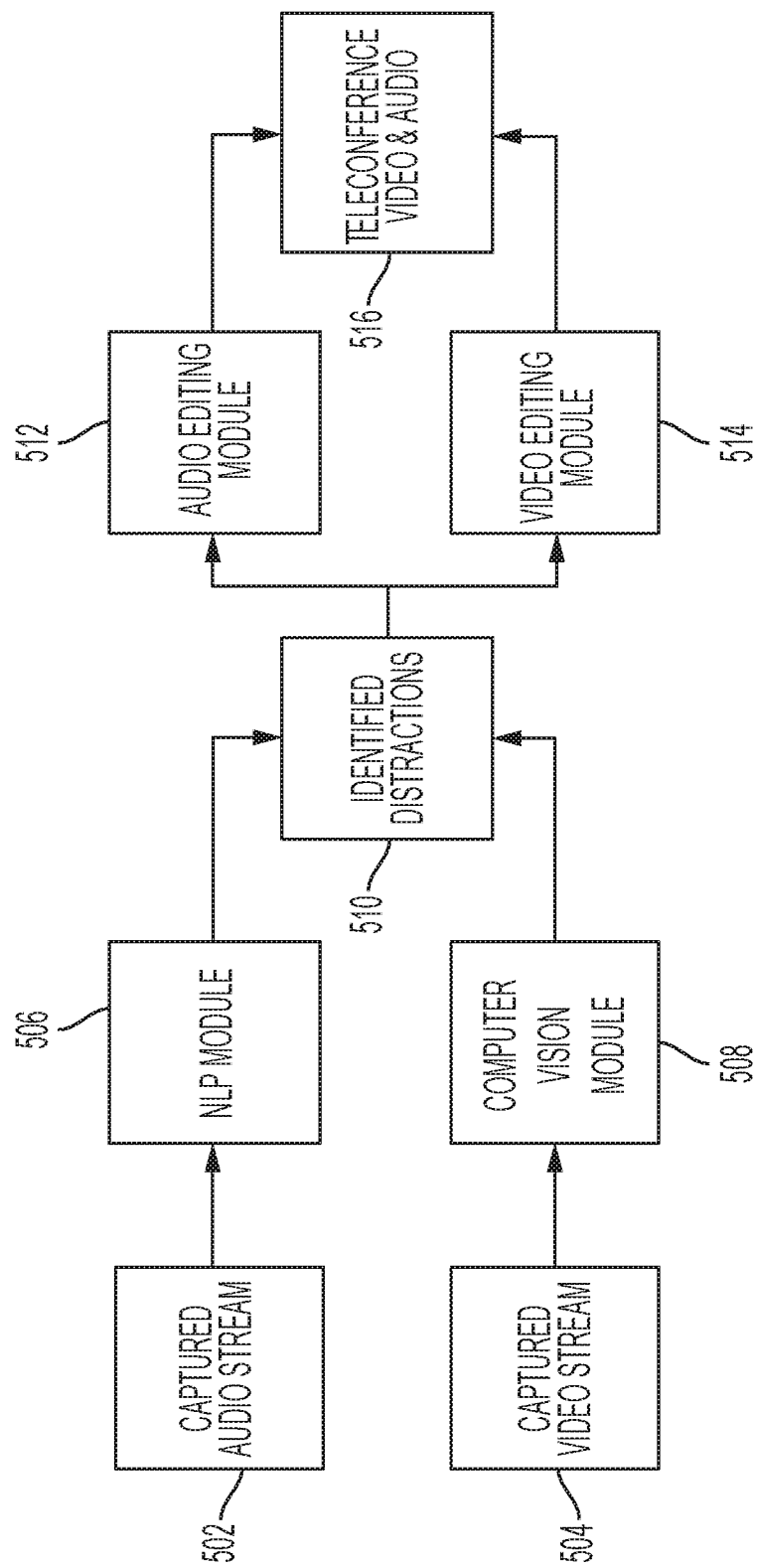
FIG. 5 is a diagram illustrating a method of identifying and filtering distraction occurring in a presentation in an embodiment.

FIG. 5 is a diagram illustrating a method of identifying and filtering distraction occurring in a presentation in an embodiment. The method may use a plurality of communication devices, for example, including audio and video cameras which capture the audience state. The captured audio and video are passed through a processing unit to identify episodes of distraction. These distraction episodes are edited to reflect and/or removed to output to the presenter's devices as less distracting video and audio. For example, a processing component such as a hardware processor and/or a program running on a hardware processor may received captured audio stream 502 and captured video stream 504. At 506, the processing component can perform a natural language processing (NPL) technique to determine the semantic content of the audio stream. At 509, the processing component can perform a computer vision technique (e.g., using a vision algorithm or tool such as an OpenCV to analyze the video stream. Based on the NPL analysis 506 and video analysis 508, at 510 the processing component can identify any distractions, for example, detected in the audience or of the viewers of the presentation. For instance, if the values resulting from the analyses at 506 and 508 exceed a threshold value, the processing component can identify that there is distraction in the audience. At 412, the processing component can edit the captured audio stream to remove the detected distracting speech. Similarly, at 514, the processing component can edit the captured video stream to remove the detected distracting video. At 516, the edited audio and video of the teleconference can be output.

Figure 6:
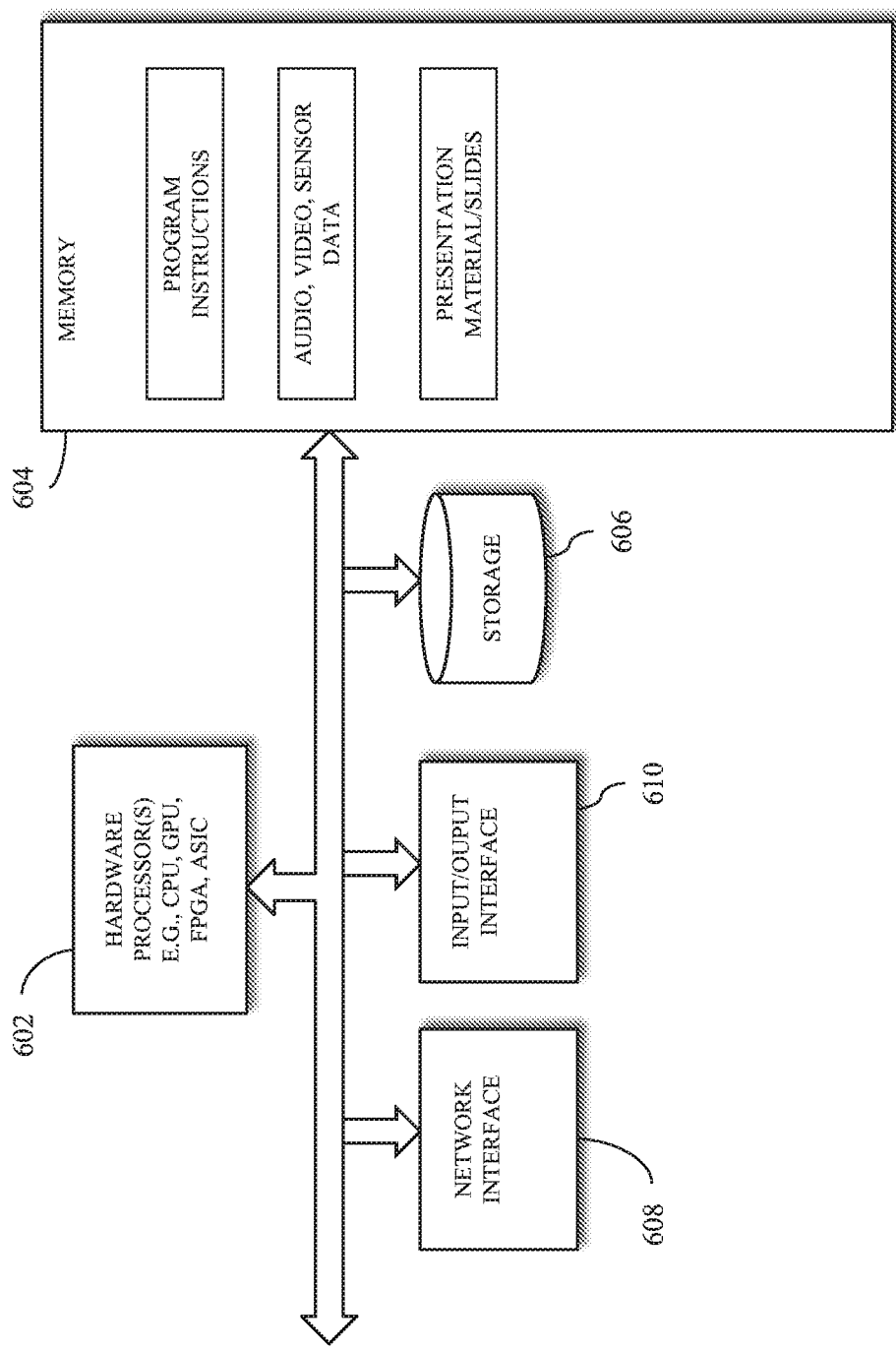
FIG. 6 is a diagram showing components of a system in one embodiment that can automatically insert content into a presentation in an embodiment.

FIG. 6 is a diagram showing components of a system in one embodiment that can automatically insert content into a presentation in an embodiment. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and dynamically insert new content into a presentation material, for example, during a presentation session. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input data from one or more devices. For instance, at least one hardware processor 602 may receive audio, image and/or video data of a presenter and/or one or more viewers, determine new content to insert and automatically insert the new content into the presentation material. In one aspect, the presentation material may be stored on a storage device 606 or received via a network interface 608 from a remote device, and may be temporarily loaded into a memory device 604. Real time audio, video and/or sensor data can be received from one or more devices and loaded into a memory device 604 for processing. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
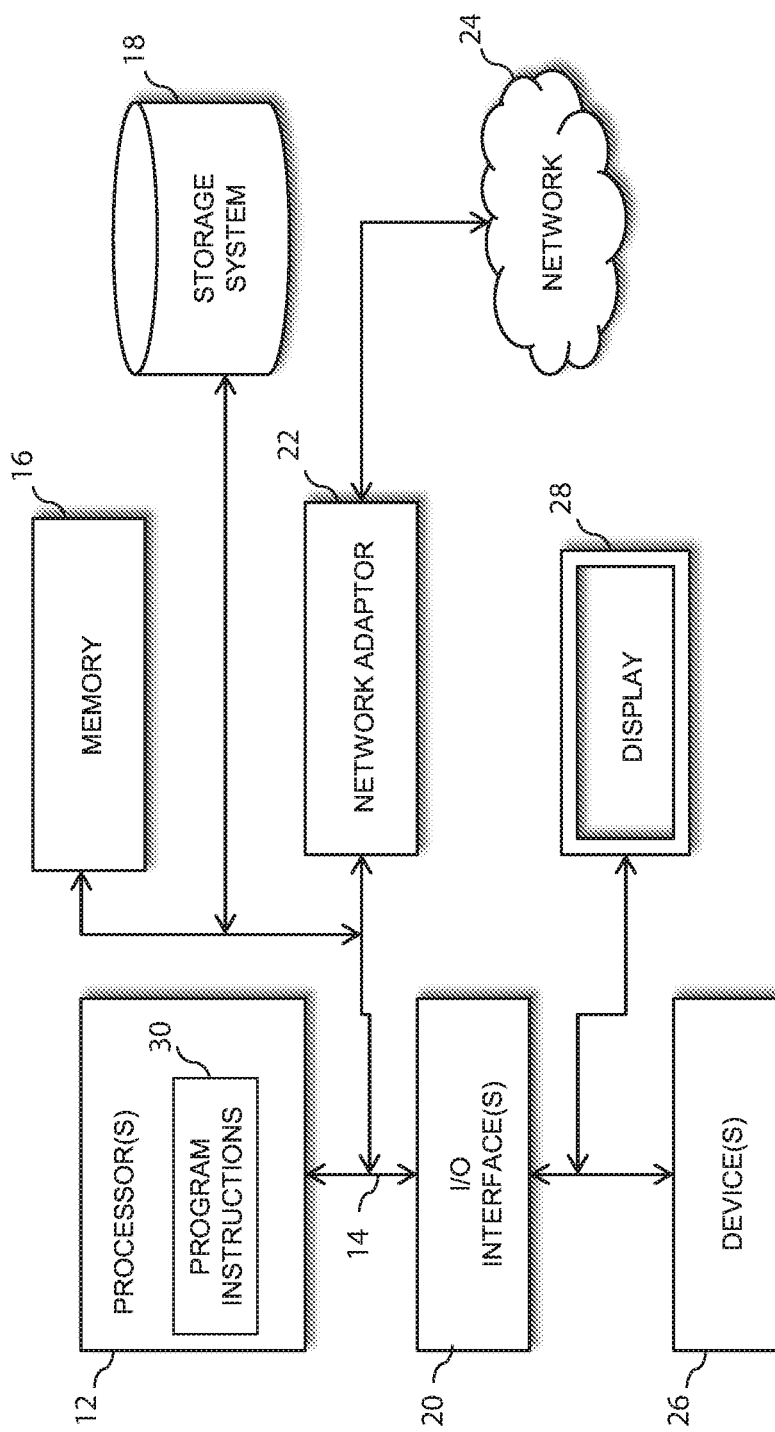
FIG. 7 illustrates a schematic of an example computer or processing system that may implement a system in one embodiment of the present disclosure.

FIG. 7 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
monitoring at least one viewer of a presentation material during a presentation;
based on the monitoring, determining new content for insertion into the presentation material; and
automatically inserting the new content to the presentation material,
wherein the new content for insertion is determined at least based on types and number of devices used by the at least one viewer and considering bandwidth required to transmit the new content to the devices, the new content for insertion determined at least further based on weights associated with a role of the at least one viewer, the new content for insertion determined at least further based on a real-time content contribution from the at least one viewer.

2. The method of claim 1, wherein the automatically inserting the new content to the presentation material includes automatically inserting the new content while the presentation material is being presented.

3. The method of claim 1, wherein the monitoring of the viewer includes at least receiving data streams from at least one device configured to monitor the viewer.

4. The method of claim 3, wherein the data streams include at least an audio data stream representing sounds of the viewer made during the presentation.

5. The method of claim 3, wherein the data streams include at least a video data stream representing video images of the viewer taken during the presentation.

6. The method of claim 1, further including:
monitoring a state of a presenter of the presentation material during the presentation;
intercepting the presenter's speech;
determining whether the intercepted presenter's speech is below a threshold confidence level; and
responsive to determining that the intercepted presenter's speech is below the threshold level, automatically adjusting the presenter's speech by voice synthesis and outputting the adjusted presenter's speech to the viewer.

7. The method of claim 6, wherein the determining whether the intercepted presenter's speech is below a threshold level includes detecting pitch and tremor levels in the presenter's speech, and determining whether the presenter's pitch and tremor levels are below the threshold confidence level.

8. A computer program product comprising a computer readable storage medium having program instructions embodied therewith, the program instructions executable by a device to cause the device to:
monitor at least one viewer of a presentation material during a presentation;
based on the monitoring, determine new content for insertion into the presentation material; and
automatically insert the new content to the presentation material,
wherein the new content for insertion is determined at least based on types and number of devices used by the at least one viewer and considering bandwidth required to transmit the new content to the devices, the new content for insertion determined at least further based on weights associated with a role of the at least one viewer, the new content for insertion determined at least further based on a real-time content contribution from the at least one viewer.

9. The computer program product of claim 8, wherein the device caused to automatically insert the new content to the presentation material includes the device caused to automatically insert the new content while the presentation material is being presented.

10. The computer program product of claim 8, wherein the device is caused to receive data streams from at least one device for monitoring the viewer.

11. The computer program product of claim 10, wherein the data streams include at least an audio data stream representing sounds of the viewer made during the presentation.

12. The computer program product of claim 10, wherein the data streams include at least a video data stream representing video images of the viewer taken during the presentation.

13. The computer program product of claim 8, wherein the device is further caused to:
monitor a state of a presenter of the presentation material during the presentation;
intercept the presenter's speech;
determine whether the intercepted presenter's speech is below a threshold confidence level; and
responsive to determining that the intercepted presenter's speech is below the threshold level, automatically adjust the presenter's speech by voice synthesis and output the adjusted presenter's speech to the viewer.

14. The computer program product of claim 13, wherein the device caused to determine whether the intercepted presenter's speech is below a threshold level includes the device caused to detect pitch and tremor levels in the presenter's speech, and determine whether the presenter's pitch and tremor levels are below the threshold confidence level.

15. A system comprising:
a hardware processor;
a memory device;
the hardware processor configured to at least:
monitor at least one viewer of a presentation material during a presentation;
based on the monitoring, determine new content for insertion into the presentation material; and
automatically insert the new content to the presentation material,
wherein the new content for insertion is determined at least based on types and number of devices used by the at least one viewer and considering bandwidth required to transmit the new content to the devices, the new content for insertion determined at least further based on weights associated with a role of the at least one viewer, the new content for insertion determined at least further based on a real-time content contribution from the at least one viewer.

16. The system of claim 15, wherein the automatically inserting the new content to the presentation material includes automatically inserting the new content while the presentation material is being presented.

17. The system of claim 15, wherein the hardware processor is configured to receive data streams from at least one device configured to monitor the viewer.

18. The system of claim 17, wherein the data streams include at least an audio data stream representing sounds of the viewer made during the presentation.

19. The system of claim 17, wherein the data streams include at least a video data stream representing video images of the viewer taken during the presentation.

20. The system of claim 15, wherein the hardware processor is further configured to:
monitor a state of a presenter of the presentation material during the presentation;
intercept the presenter's speech;
determine whether the intercepted presenter's speech is below a threshold confidence level; and
responsive to determining that the intercepted presenter's speech is below the threshold level, automatically adjust the presenter's speech by voice synthesis and output the adjusted presenter's speech to the viewer.

* * * * *